UNITED STATES PATENT OFFICE.

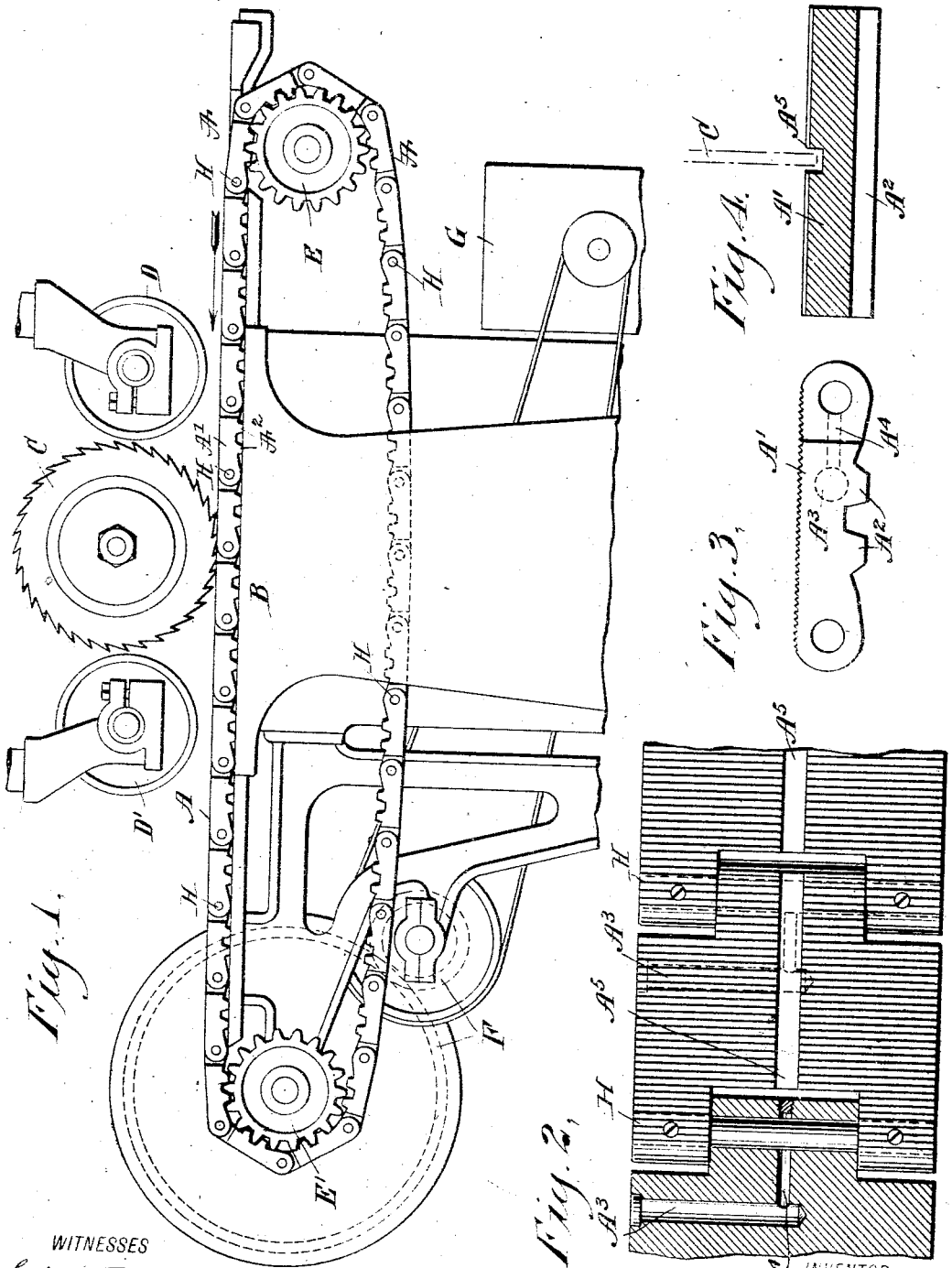

GEORGE A. ENSIGN, OF DEFIANCE, OHIO, ASSIGNOR TO DEFIANCE MACHINE WORKS, OF DEFIANCE, OHIO.

FEED MECHANISM FOR SAWING-MACHINES.

1,160,057.

Specification of Letters Patent.

Patented Nov. 9, 1915.

Application filed May 7, 1914. Serial No. 836,955.

*To all whom it may concern:*

Be it known that I, GEORGE A. ENSIGN, a citizen of the United States, and a resident of Defiance, in the county of Defiance and State of Ohio, have invented a new and Improved Feed Mechanism for Sawing-Machines, of which the following is a full, clear, and exact description.

The object of the invention is to provide a new and improved feed mechanism for sawing machines, arranged to insure a practically smooth, uninterrupted, steady feeding of the material to the saw, and to allow of running the feed mechanism at a high rate of speed thus increasing the output of the sawing machine.

In order to accomplish the desired result, use is made of an endless feed chain, the links of which are provided with gear teeth adapted to mesh with gear wheels, of which one or both are driven.

A practical embodiment of the invention is represented in the accompanying drawings forming a part of this specification, in which similar characters of reference indicate corresponding parts in all the views.

Figure 1 is a side elevation of the feed mechanism as applied to a circular rip saw; Fig. 2 is an enlarged plan view of a portion of the feed chain, one of the links being shown in section; Fig. 3 is an enlarged side elevation of one of the links; and Fig. 4 is a cross section of the same.

In feed mechanisms for band saws, circular rip saws and similar sawing machines as now generally constructed, use is made of hexagon feed rolls around which passes an endless feed chain for feeding the boards, sticks or other wood material to the saw. In order to impart a traveling motion to the chain with a view to pull the upper run of the chain over the table one or both of the feed rolls are driven but owing to the fact that the radial distance on the flat surface of the hexagon rolls is less than the radial distance at the corners, a jerky motion is produced every time a corner of the hexagon feed roll passes over the center of the feed roll. In order to overcome this differential, jerky motion use is made of the improvements presently described in detail.

The upper run of the endless feed chain A passes over the table B to carry the stock to the circular saw C to be cut by the latter, the stock passing under the rolls D, D' arranged in the front and rear of the circular saw C to hold the stock down while being cut by the saw C. The endless feed chain A passes around gear wheels E and E', of which the gear wheel E' is driven by a suitable gearing F driven by pulley and belt from a motor G. Other means may be employed for rotating one or both of the gear wheels E and E' if desired. The links A' forming the feed chain A are pivotally connected with each other by pivots H and the upper surface of each link A' is flat and preferably roughened so as to insure a firm grip on the stock fed by the feed chain to the saw C. The under side of each link A' is provided with gear teeth $A^2$ adapted to mesh with the gear teeth of the feed gear wheels E and E', it being understood that the said teeth $A^2$ are located intermediate the pivotal ends of the link and the pivotal ends are free of teeth so as to insure proper meshing of the teeth $A^2$ with the teeth of the feed gear wheels E and E'. As shown in the drawings, the adjacent teeth of two adjacent links A' are spaced apart a distance corresponding to that between three of the teeth of either gear wheel E, E' to insure a proper meshing of the gear teeth $A^2$ with the teeth of the gear wheels E and E' at the time the link passes onto such gear wheel and leaves the same.

It will be noted that the terminal faces of the gear teeth $A^2$ of each link are flush with the under side of the link so that the teeth do not form undesirable projections while the upper run of the chain travels over the table and the links rest firmly on the table during the travel of the links over the table so that the material to be sawed is properly supported. It will further be noted that by the arrangement described the pitch line of the teeth $A^2$ is located as near as possible to a straight line extending through the pivotal centers of the link, so that when the link passes around a gear wheel the jerky motion is reduced to a minimum.

As the feed gear wheel E' is continually and uniformly driven, it is evident that uniform and steady traveling motion is given to the endless feed chain A, thus insuring proper feeding of the material to the saw at the same time allowing the feed gear wheels E and E' to rotate at a high rate of speed to increase the capacity of the sawing machine.

By reference to Fig. 1 it will be seen that the feed gear wheels E and E' are arranged relatively to the upper face of the table B so that the links A' at the top of the said gear wheels are slightly inclined to compensate for wear and variations in the links.

As shown in Fig. 2, each link A' is provided with a transverse bore A³ filled with cotton or other material saturated with oil or other lubricant, and from this bore A³ leads a feed channel A⁴ to the corresponding pivot pin H to keep the latter properly lubricated. The outer ends of the bore A³ and the channel A⁴ are closed by suitable plugs or caps, as indicated in Fig. 2. The top of each link A' is provided with a longitudinally extending groove A⁵ for the points of the teeth of the saw C to pass in (see Fig. 4), so that the saw makes a clean cut in the stock.

Having thus described my invention, I claim as new and desire to secure by Letters Patent:

In combination, a table, revoluble gear wheels journaled adjacent the ends of the said table, and an endless feed chain passing around the said gear wheels and having its upper run passing over the said table, the said chain having links pivotally connected with each other and having straight upper faces, the links being provided with gear teeth at their underside the terminal faces of which are flush with the underside of the link, the said gear teeth being adapted to mesh with the teeth of the said gear wheels, the links uppermost on the said gear wheels at a time being slightly inclined relative to the said table.

In testimony whereof I have signed my name to this specification in the presence of two subscribing witnesses.

GEORGE A. ENSIGN.

Witnesses:
C. C. HOFFMAN,
DON L. SWITZER.